W. J. NORRIS.
HEADLIGHT.
APPLICATION FILED JULY 23, 1918.
1,308,858.
Patented July 8, 1919.
2 SHEETS—SHEET 1.
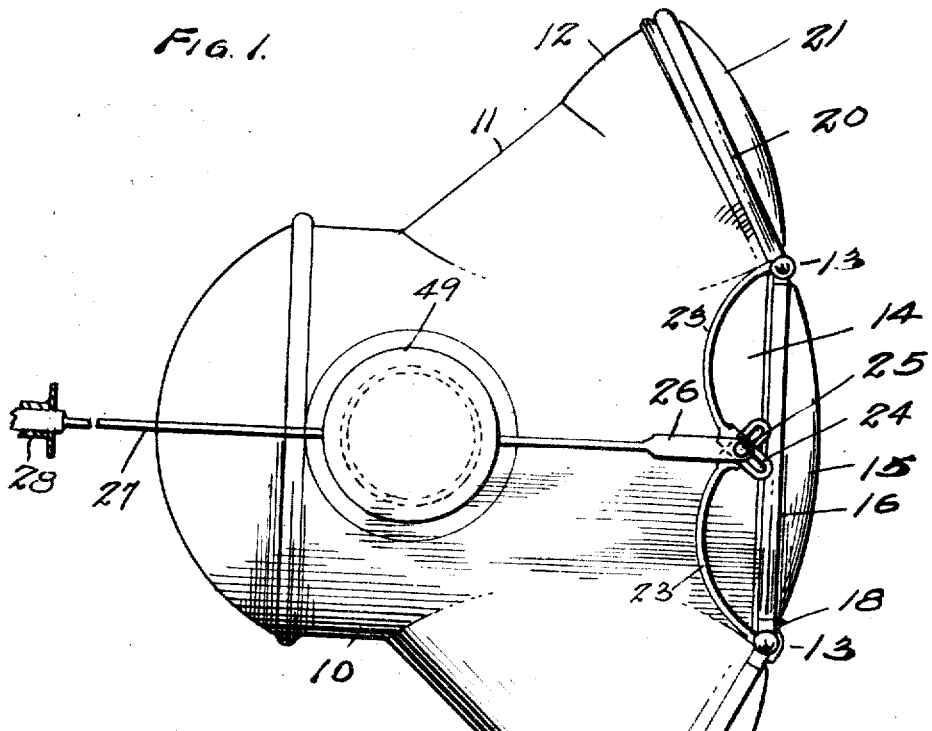
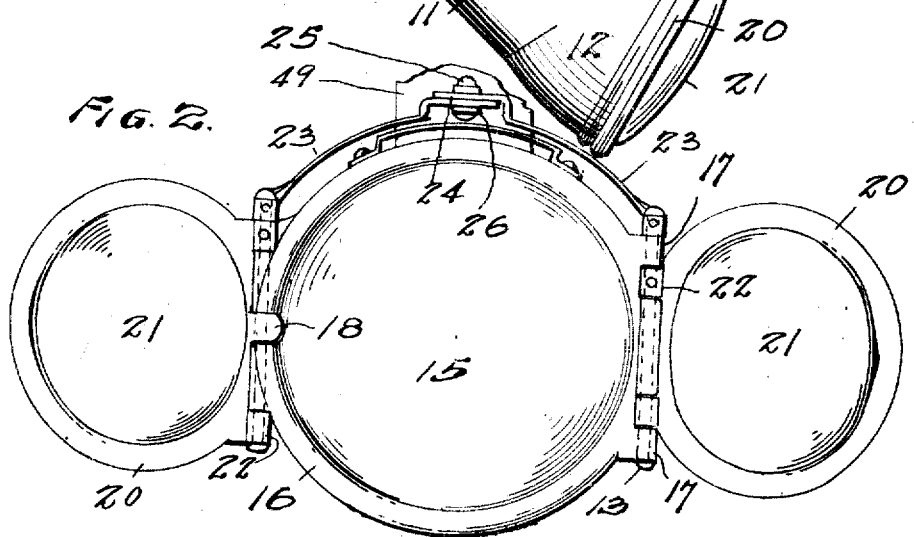
INVENTOR
W. J. NORRIS
BY C. M. Parker
ATTORNEY W. J. NORRIS.
HEADLIGHT.
APPLICATION FILED JULY 23, 1918.
1,308,858.
Patented July 8, 1919.
2 SHEETS—SHEET 2.
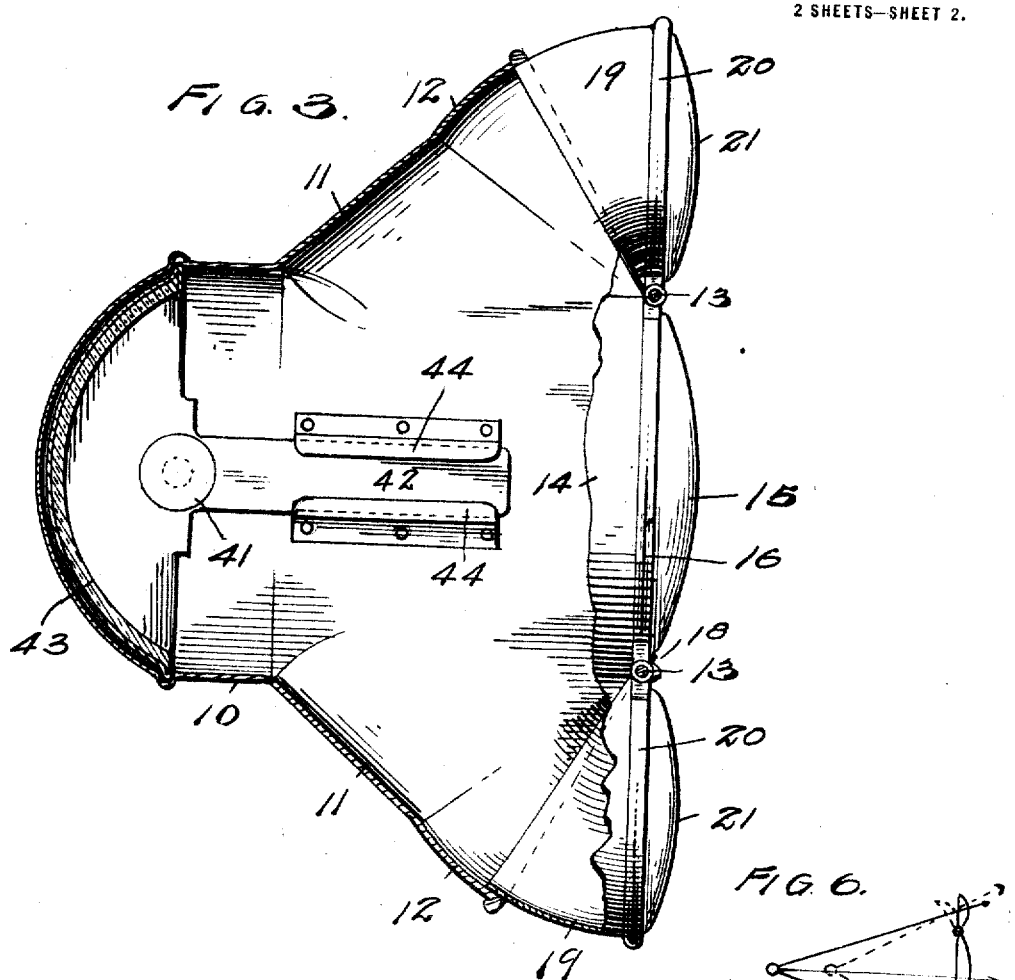
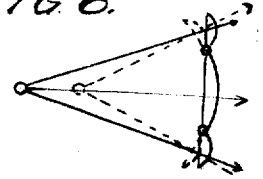
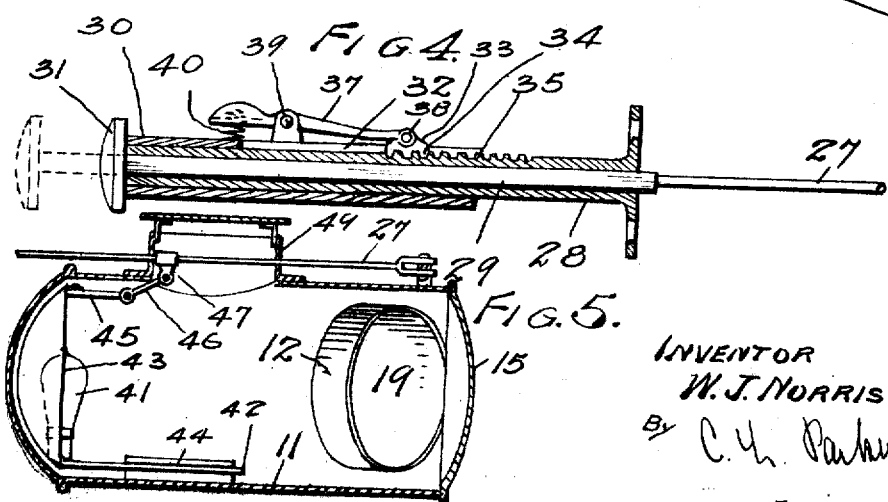
INVENTOR
W. J. NORRIS
By C. H. Parker
ATTORNEY

UNITED STATES PATENT OFFICE.

WILLARD J. NORRIS, OF CHARLESTON, WEST VIRGINIA.

HEADLIGHT.

1,308,858.

Specification of Letters Patent.

Patented July 8, 1919.

Application filed July 23, 1918. Serial No. 246,341.

*To all whom it may concern:*

Be it known that I, WILLARD J. NORRIS, a citizen of the United States, residing at Charleston, in the county of Kanawha and State of West Virginia, have invented certain new and useful Improvements in Headlights, of which the following is a specification.

My invention relates to improvements in lamps, adapted for use upon automobiles, railway vehicles, ships or the like.

An important object of the invention is to provide a lamp of the above mentioned character, having a lens or lenses which are adjustable for directing or distributing the light over an increased area, when desired.

A further object of the invention is to provide means to shift the source of light, with the angular adjustment of the lens or lenses, so that the source of light will occupy a proper position to cause the rays of light therefrom to pass generally through the lenses, at a right angle thereto.

A further object of the invention is to provide a lamp of the above mentioned character, which is simple in construction, comparatively inexpensive to manufacture, and convenient in use.

Other objects and advantages of the invention will be apparent during the course of the following description.

In the accompanying drawings forming a part of this specification and in which like numerals are employed to designate like parts throughout the same, Figure 1 is a plan view of a lamp embodying my invention, Fig. 2 is a front end elevation of the same, Fig. 3 is a horizontal longitudinal sectional view through the lamp, Fig. 4 is a longitudinal section through the manually operated means to adjust the lenses, parts being shown in elevation, Fig. 5 is a central vertical longitudinal sectional view through the lamp, Fig. 6 is a diagrammatic view showing the adjustments of the lenses and source of light.

In the drawings, wherein for the purpose of illustration is shown a preferred embodiment of my invention, the numeral 10 designates a longitudinal casing, which is preferably horizontally arranged. This longitudinal casing is provided at its forward end with a pair of lateral extensions 11, which are angularly arranged, and diverge forwardly. These lateral extensions have outer portions 12, which are longitudinally curved and are struck upon arcs having their centers at 13, this numeral also designating pivot elements or pins.

The forward end 14 of the longitudinal casing 10 is formed open, and is adapted to be covered by a main lens 15, carried in a swinging frame 16. This frame is equipped with ears or knuckles 17, which are free to turn upon the pin 13. A suitable latch 18, is employed to retain the frame 16 in the closed position.

The numeral 19 designates auxiliary casing sections, arranged to swing within the extensions 12, and being longitudinally curved, to conform to the curvature of the same. The casing sections 19 are rigidly secured to frames 20, carrying auxiliary lenses 21, as shown. The frames 20 have apertured ears or knuckles 22, receiving the pins 13, and rigidly clamped thereto. It is thus apparent that by turning the pins 13, the auxiliary lenses 21 may be swung or angularly adjusted in a horizontal plane.

Means are provided to turn the pins 13, comprising cranks 23, rigidly secured to the upper ends of the pins. These cranks extend inwardly and have overlapping slotted ends 24, receiving a bolt or pivot 25, carried by the head 26 of a longitudinally movable rod 27.

Rigidly secured to a suitable support, in convenient reach of the operator, is a tubular housing 28, receiving therein a reciprocatory rod 29, having the rod 27 connected therewith. Mounted upon the tubular housing 28 is a reciprocating sleeve 30. A head or button 31 is rigidly attached to the rod 29 and sleeve 30. The sleeve 30 has a longitudinal slot 32, receiving a transversely reciprocatory block 33, provided with teeth 34, to engage with teeth 35, which are formed upon the base 28. The block 33 is pivoted to a thumb-lever 37, as shown at 38, and this thumb-lever is pivoted at 39. The rear end of the thumb-lever is forced upwardly by a spring 40.

The numeral 41 designates a source of light, which may be an electric lamp, gas lamp, or oil lamp. This source of light is suitably mounted upon a carriage 42, which is movable longitudinally of the casing 10, in a manner to be described. Arranged rearwardly of the source of light 41 and rigidly secured to the carriage 42, is a reflector 43, which is longitudinally curved in a horizontal plane, as shown. This reflector is sufficiently long and is suitably curved whereby portions thereof serve to reflect light through all of the lenses. The carriage 42 is mounted to slide within or upon longitudinal track 44, secured within the casing 10.

Rigidly secured to the reflector 43 is a horizontal arm 45, to the outer end of which is pivoted a link 46, this link extending upwardly for connection with an arm 47, in turn connected with the rod 27. The arm 47 projects into an apertured dome 49, provided to allow of the escape of heat generated by the souce of light 41. It is thus seen that the longitudinal movement of the rod 27 is utilized to shift the carriage 42 longitudinally.

The operation of the lamp is as follows:

When it is desired to have the rays of light passing through the three lenses 15 and 21 merge or form in effect a single light, the lenses 21 are arranged so that their axes are substantially parallel with the axis of the lens 15, or the lenses 21 may have their axes slightly forwardly converging. When the lenses 21 are in this position, the button or knob 31 may assume the rear position as indicated in dotted lines in Fig. 4.

To swing the lenses 21 rearwardly, so that their axes diverge forwardly, the button 31 is pushed forwardly, after the rod is released by manipulation of the thumb-lever 37. This forward movement of the rod 29 moves the rod 27 forwardly, which in turn swings the bell crank levers 23 forwardly, causing the casing sections 19 and frames 20 to move rearwardly. Upon the forward movement of the rod 27, the carriage 42 moves forwardly, thereby advancing the source of light 41 and reflector 43, with relation to the angularly arranged lenses 21.

As illustrated diagrammatically in Fig. 6, the rays of light from the source of light 41, are retained more or less perpendicular to the lenses 21, when these lenses occupy the several adjusted positions, which is effected by shifting the source of light toward or away from these lenses.

From the foregoing description it is obvious that rays of light pass through the main lens 15 and are projected forwardly in a straight line, while the rays of light passing through the auxiliary lenses 21, may be projected forwardly in parallel relation to the rays of light passing through the lens 15, or may assume angular positions, converging or diverging with relation thereto. By this means the rays of light may be spread over an area of varying sizes.

It is to be understood that the form of my invention herewith shown and described is to be taken as a preferred example of the same, and that various changes in the shape, size, and arrangement of parts may be resorted to without departing from the spirit of the invention or the scope of the subjoined claims.

Having thus described my invention, I claim:

1. A lamp of the character described, comprising a swinging lens, a source of light, and means to simultaneously swing the lens and move the source of light toward or away from the lens.

2. A lamp of the character described, comprising a lens adapted to be shifted in a horizontal plane to assume different angular positions, a source of light adapted to be moved horizontally toward and away from the lens, and common means to shift the lens and move the light.

3. A lamp of the character described, comprising a relatively stationary lens, a source of light arranged rearwardly of the lens and in substantial alinement with the longitudinal axis thereof, means whereby the source of light may be moved toward and away from the lens at substantially a right angle thereto, and an angularly adjustable lens arranged upon one side of the relatively stationary lens and adapted to be shifted to different angular positions with respect to the longitudinal axis of the relatively stationary lens.

4. A lamp of the character described, comprising a casing, a main lens connected with the forward end thereof, angularly adjustable lenses connected with the forward end of the casing and disposed upon opposite sides of the main lens, means to move the angularly adjustable lenses, a source of light arranged within the casing rearwardly of the lenses, and means connecting the source of light and angularly adjustable lenses to move them.

5. A lamp of the character described, comprising a casing, a main lens connected with the forward end of the casing, angularly adjustable lenses connected with the forward end of the casing and disposed upon opposite sides of the main lens, a carriage longitudinally movably mounted within the casing, a source of light connected with the carriage, a reflector secured to the carriage rearwardly of the source of light and coacting with all of the lenses, and connecting the carriage and angularly adjustable lenses to move then in unison.

In testimony whereof I affix my signature in presence of two witnesses.

WILLARD J. NORRIS.

Witnesses:
S. E. RAYNES,
C. W. McCLUNG.